United States Patent
Marthaler et al.

(10) Patent No.: US 11,775,711 B2
(45) Date of Patent: Oct. 3, 2023

(54) METHOD FOR MODELING OF A SYSTEM BY MEANS OF A QUANTUM COMPUTER

(71) Applicant: HQS Quantum Simulations GmbH, Karlsruhe (DE)

(72) Inventors: Michael Marthaler, Karlsruhe (DE); Jan-Michael Reiner, Karlsruhe (DE); Sebastian Zanker, Karlsruhe (DE); Iris Schwenk, Karlsruhe (DE)

(73) Assignee: HQS Quantum Simulations GmbH, Karlsruhe (DE)

( * ) Notice: Subject to any disclaimer, the term of this patent is extended or adjusted under 35 U.S.C. 154(b) by 699 days.

(21) Appl. No.: 16/968,988

(22) PCT Filed: Feb. 6, 2020

(86) PCT No.: PCT/DE2020/100075
§ 371 (c)(1),
(2) Date: Aug. 11, 2020

(87) PCT Pub. No.: WO2020/207519
PCT Pub. Date: Oct. 15, 2020

(65) Prior Publication Data
US 2021/0232739 A1  Jul. 29, 2021

(30) Foreign Application Priority Data
Apr. 12, 2019  (DE) .................. 10 2019 109 816.5

(51) Int. Cl.
*G06N 10/20* (2022.01)
*G06F 30/27* (2020.01)
(Continued)

(52) U.S. Cl.
CPC ............ *G06F 30/27* (2020.01); *G06N 10/00* (2019.01); *G06N 10/20* (2022.01); *G06F 2111/08* (2020.01)

(58) Field of Classification Search
CPC ..... G06F 30/27; G06F 2111/08; G06N 10/00; G06N 10/20
See application file for complete search history.

(56) References Cited

U.S. PATENT DOCUMENTS

2018/0096085 A1  4/2018  Rubin
2019/0049495 A1*  2/2019  Ofek ..................... G06F 9/5027

OTHER PUBLICATIONS

Kernam et al., Trotter-Based Simulation of Quatum-Classical Dynamics, J. Phys. Chem. B 2008, pp. 424-432. (Year: 2008).*
(Continued)

*Primary Examiner* — Nghia M Doan
(74) *Attorney, Agent, or Firm* — Collard & Roe, P.C.

(57) ABSTRACT

For manufacturing-related reasons, the qubits of known quantum computers are not to be regarded as equivalent, but instead a standard quantum computer has not only high-performance qubits with long decoherence times and good fidelities of operation but also low-performance qubits with short decoherence times and poor fidelities of operation. The invention utilizes these by subdividing a system to be modeled with such a quantum computer into a bath part of low relevance and a cluster part of high relevance, wherein a rough description of the bath part is assigned to the low-performance qubits and an exact description of the cluster part is assigned to the high-performance qubits.

13 Claims, 2 Drawing Sheets

(51) Int. Cl.
    *G06N 10/00*     (2022.01)
    *G06F 111/08*     (2020.01)

(56) References Cited

OTHER PUBLICATIONS

International Search Report in PCT/DE2020/100075, dated May 8, 2020.
Donal Mac Kernan et al. "Trotter-Based Simulation of Quantum-Classical Dynamics +" Journal of Physical Chemistry Part B, US, vol. 112, No. 2, Jan. 1, 2008 (Jan. 1, 2008), pp. 424-432 DOI: 10.1021/jp0761416 ISSN: 1520-6106, XP055689160.
Iris Schwenk et al. "Distortion of a reduced equilibrium density matrix: Influence on quantum emulation" Physical Review B, vol. 93, No. 1, Jan. 1, 2016 (Jan. 1, 2016), pp. 14305-1 to 14305-7.

\* cited by examiner

METHOD FOR MODELING OF A SYSTEM BY MEANS OF A QUANTUM COMPUTER

CROSS REFERENCE TO RELATED APPLICATIONS

This application is the National Stage of PCT/DE2020/100075 filed on Feb. 6, 2020, which claims priority under 35 U.S.C. § 119 of German Application No. 10 2019 109 816.5 filed on Apr. 12, 2019, the disclosure of which is incorporated by reference. The international application under PCT article 21(2) was not published in English.

BACKGROUND OF THE INVENTION

Field of the Invention

The present invention relates to a method for modeling of a system with the aid of a quantum computer.

Description of the Related Art

The functional principle of a quantum computer has already been known for a long time as a theoretical concept and for some time has also been implemented already in practice. Whereas in conventional digital computers the information is represented in bits, which in principle are switches into an On or an Off position, the information in the quantum computer, although likewise binary in principle, is represented by quantum-mechanical states. These may be usually the spin of an electron, energy levels of atoms or the current direction, the charge or the magnetic flux in a superconductor. Regardless of the choice of the physical implementation, such a two-state quantum-mechanical system is known as a qubit.

Such a quantum computer is particularly suitable for certain problems, in which the needed computer resources grow exponentially with the system size. Whereas, for the mapping of such a system onto a conventional digital computer, a doubling of the computing power by a doubling of the number of transistors and of the memory capacity is necessary for each additional system element, and therefore, for example, for an orbital of a molecule or a variable of an optimization problem, such a doubling of the computing power in the case of a quantum computer requires merely the addition of a further qubit. This is because the state of a quantum register, i.e. of a register of state vectors describing qubits, may be a superposition of many states, e.g. all $2^n$ states, where n is the number of qubits in the register, and the superposition states may be dependent on one another (so-called entanglement), so that the possibilities of describing a state with qubits are much more extensive.

For the time being, however, existing quantum computers are not yet capable of utilizing this advantage, since the fabrication of the qubits is still very immature at present and therefore it is not yet possible to take the natural physical restrictions of qubits into consideration completely satisfactorily during fabrication. Quantum-mechanical systems are intrinsically susceptible to failure and therefore exhibit an intrinsic error, which arises due to interaction with the surroundings. This leads to the following problems.

In this connection, the relaxation designates the tendency of the system to reach a condition of equilibrium with its environment. For the quantum computer, this may be associated with a change of state of the qubits. The relaxation time $T_1$ is defined as the characteristic time with which the system approaches its equilibrium state.

Decoherence is understood as the loss of the quantum-mechanical state in favor of a classically describable state. Here also, the decoherence time $T_2$ describes the characteristic time frame in which such a change from a quantum-mechanical state to a classically describable state occurs.

In quantum computers that are currently available, the problem arises—due to fabrication technology that at present is not yet mature—that not all qubits of a quantum computer have the same quality with respect to relaxation and especially decoherence. Also, the fidelity with which the operations on the qubits are executed is low, which likewise plays a major role. Thus a qubit that has a long decoherence time and on which operations may be applied with great fidelity may be regarded as a high-performance qubit, whereas a qubit with a short decoherence time and poor operation fidelity is regarded as a low-performance qubit.

Consequently, in order to model a system with the currently available quantum computers, i.e. in order to simulate its behavior, either only the high-performance qubits may be used or it is necessary to work with error corrections. The first of these options restricts the areas of use of the quantum computers quite considerably, since only 50 to 70 qubits are available to current quantum computers. If one qubit is needed for representation of each system element, only very simple systems may be modeled in an absence of the low-performance qubits. Modeling such simple systems is also already possible by means of digital computers. In contrast, if an error correction is desired, the necessary use of qubits for this purpose increases by a multiple (5000 times), and so such an error correction cannot yet be implemented in practice in the current development situation.

SUMMARY OF THE INVENTION

Against this background, the task underlying the invention is to propose a method with which, despite the said imponderables, a usable modeling even of complex systems can nevertheless be accomplished.

This is achieved by a method for modeling of a system by means of a quantum computer according to the features of claim 1. Practical configurations of such a method may be inferred from the dependent claims following it.

According to the invention, it is intended to analyze a system to be modeled having system elements of respectively two states, first of all with respect to its composition and its structure, and to identify a particularly relevant part of the system, the so-called cluster, which is to be described as exactly as possible. Less relevant parts of the system to be mapped, which can be described conventionally, are referred to as the bath, by analogy with the term for an environment functioning as a heat bath and already having a temperature upon the advent of the system. Relevant areas of the system, to which particular attention is to be paid and which are to be described quantum-mechanically, are referred to as clusters. According to the invention, such a subdivision into bath and cluster is undertaken in a first step.

Now it is necessary to have this system mapped to a quantum computer. For this purpose, it is also intended to make a distinction between various qubits. Currently known quantum computers are created with approximately 50 to 70 qubits although, according to the definition described in the introduction, not all of those are high-performance qubits. The properties can be analyzed for individual qubits and pairs of qubits that are capable of executing 2 qubit operations with one another. Based on this, it is possible, according to the foregoing definition, to classify the qubits as high-performance and low-performance qubits. For example, this subdivision can be established in the ratio of the qubits present on the chip, based on the needed number of high-performance qubits or on a fixed limit value. Such an evaluation must therefore be undertaken only once, in order to find the high-performance qubits, although it can certainly be repeated at later times if necessary or even executed regularly.

Within the scope of the present method, a correlation of the high-performance qubits to the modeling of the system elements of the cluster then takes place, while the bath is formed by the low-performance qubits. This permits a reliable and exact description of the relevant model parts, while quality-related error-containing calculations take place mainly in the areas of the bath, i.e. of the less relevant parts of the system.

Particularly advantageously, the system properties of the qubits on which the evaluation is based include their decoherence times, the quality of the transitions between connected qubits, which can perform 2-quidbit operations and their mutual effects upon one another and the fidelity of the 2 qubit operations, which are measured and saved as properties of the individual qubits. The longer the decoherence time of a qubit is, the longer it will remain without further excitation in an occupied state and the more reliable the result determined via this qubit will be. The higher the fidelity of the operations of the qubit or qubit pair is, the higher will also be the fidelity with which the properties of the system may be modeled.

For the modeling of the cluster by the high-performance qubits, it is possible to proceed specifically in such a way that the system elements to be mapped and their interactions are represented by the qubits. Conversely, however, the procedure is different for the system elements of the bath, which are mapped by the low-performance qubits. By means of a few low-performance qubits, only those core properties of the bath that encompass the effect of the bath on the cluster are represented. One possibility is the representation of the bath properties by its spectrum, for example the spectral power density. On the basis of the great spectral width of these low-performance qubits resulting from the short decoherence time, the contribution of several system elements of the bath may be combined and in this way these system elements may be mapped together by means of a low-performance qubit. Thus the natural errors of the qubits are utilized in order to permit the simulation of the bath.

For further simplification and economy of capacity, the bath may further be reduced to essential characteristics defined during the mapping process, via which characteristics the bath is adequately described for the purposes of the modeling. Due to the selective omission of additional information, it is possible to economize on further qubits and in this way to model the model completely, albeit in a low level of detail.

In one specific application, the method described in the foregoing may be used for calculation of fermionic models, especially of solid-state models or molecular models.

Furthermore, the method is suitable for mapping of Heisenberg models or XYZ models, as well as of further spin models.

However, even more general questions, such as optimization problems, such as, for example, a QUBO problem or a Boltzmann machine, may be modeled with the described method.

BRIEF DESCRIPTION OF THE DRAWINGS

The invention described in the foregoing will be explained in more detail hereinafter on the basis of an exemplary embodiment, wherein.

DETAILED DESCRIPTION OF PREFERRED EMBODIMENTS

Figure 1:
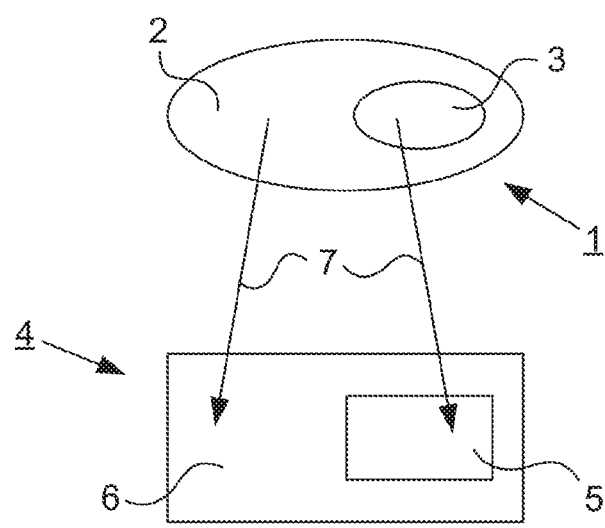
FIG. 1 shows a schematic representation of the correlation between system elements of a system to be mapped and the qubits of a quantum computer, on the example of the modeling of a molecule.

FIG. 1 shows a schematic representation of a system 1 to be modeled, in the present case a molecule, the behavior of which is to be simulated, in order to examine its suitability as a medication. In this context, it is known that molecules have individual functional groups, which function as receptors for certain substances. Whereas the functionality of the medication as such depends substantially on how these groups behave, the rest of the molecule is of little specific relevance, since it represents merely the carrier of the functional groups. Certainly this rest must be present, but it does not necessarily have to be described in detail for a suitable modeling.

To that extent, this molecule represents a system 1 to be described, which can be subdivided into a cluster 3, namely the said functional groups, as well as a bath 2, namely the rest of the molecule. Whereas the cluster 3 is therefore to be modeled and thereby simulated as exactly as possible, a rough modeling of the bath 2 is completely sufficient for the purposes of examination of the molecule for its suitability as a medication.

Therefore, during a mapping process 7, the correlation of the bath 2 to the low-performance qubits 6 is established, as is that of the cluster 3 to the high-performance qubits 5 within a quantum computer 4.

By the fact that the part of the molecule having little relevance is represented by the low-performance qubits 6 whereas the relevant parts in the cluster 3 are calculated by the few high-performance qubits 5, it may be reliably assured that the necessary calculation accuracy can be achieved with the greatest possible effect. Even though error-containing calculations take place, they are mainly shifted to an unimportant part of the calculation, in order in this way to be able to obtain a usable result and to utilize the special effect of the quantum computer 4 despite its weaknesses. Conversely, even the error-containing calculations are used more in such a way that they reproduce properties of the molecule. Thereby much larger systems can be represented than would actually be possible on the respective quantum computer.

Figure 2:
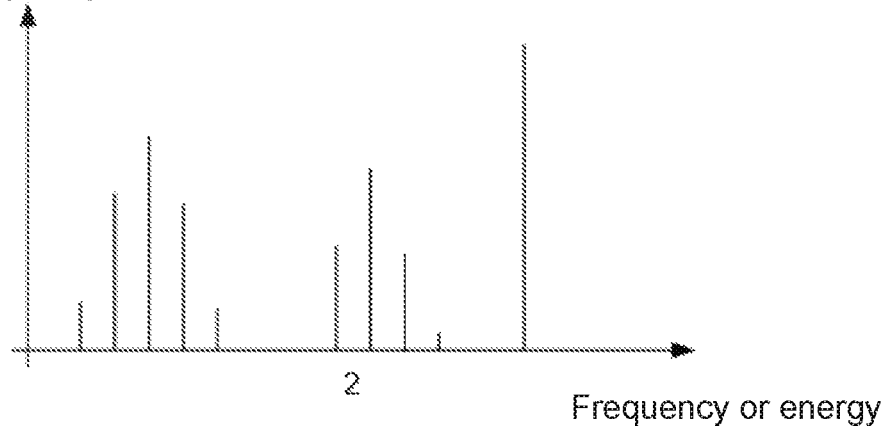
FIG. 2 shows a diagram for illustration of a partial segment of states from the bath on the example of the modeling of a molecule.
Figure 3:
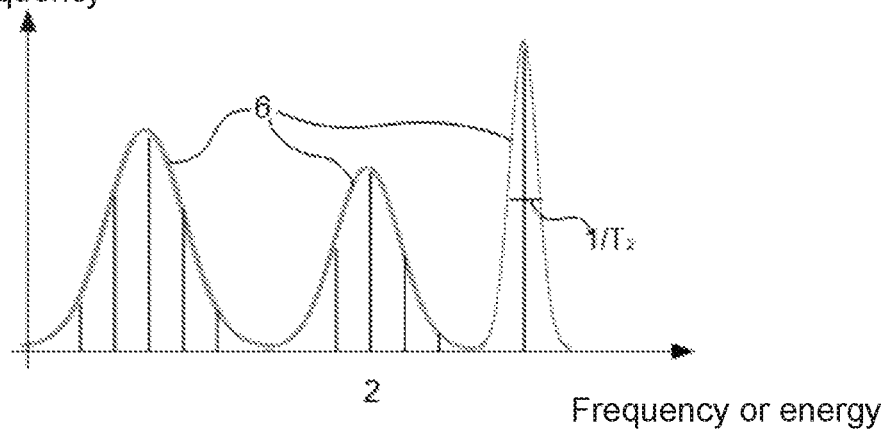
FIG. 3 shows the diagram according to FIG. 2 with a correlation to individual qubits.

The orbitals of the cluster 3, together with their interactions, are represented by the high-performance qubits 5. The orbitals of the bath 2 are represented only approximately by their core properties. This can be done, for example, by means of their spectrum. This functions as illustrated in FIGS. 2 and 3. These show individual classically describable states of system elements in the context of the energy levels, wherein the present case of a molecule is intended to relate to orbitals within the molecule. Depending on presence of an electron, these may occupy a state 0 or a state 1. For the effect of the bath 2 on the cluster 3, the existence of state values in certain areas is essential. The Dirac impulses represent the discrete state values or orbitals of the rest of the molecule i.e. of the bath.

Each orbital is to be described during modeling by one qubit 5, 6, the state of which corresponds to the state of the respective orbital. The qubits in turn are consequently able to occupy not only the state |0> or |1> but even superpositions between them, so that the quantum-mechanical description of the orbitals must be regarded as eminently applicable.

As follows from FIG. 3, the state areas of the qubits may be described with Lorentz curves, which in the mathematics corresponds to an approximation of the Dirac impulse. The narrower the Lorentz curve is in this case, the longer is the decoherence time of the associated qubit 5, 6. Furthermore, the width is influenced not only by the decoherence time, but also by the fidelity of the operations, since the spectra are also generated by these operations. Low-performance qubits 6 may be used in order to represent several state values at the same time, so that a low-performance qubit 6 is able to map several system elements, i.e. orbitals, certainly in greatly simplified manner but consequently with a low expenditure. It succeeds by the fact that, despite the qubits 5, 6 present in very limited quantity, which in current quantum computers 4 amounts only to approximately 50 to 70, even more complex molecules can be appropriately simulated and thereby the capabilities of the quantum computer can be utilized as well as possible.

What has been described in the foregoing is therefore a method with which, despite some imponderables of known quantum computers, a usable modeling of even complex systems can nevertheless be achieved.

LIST OF REFERENCE SYMBOLS

1 System
2 Bath
3 Cluster
4 Quantum computer
5 High-performance qubits
6 Low-performance qubits
7 Mapping process
$T_2$ Decoherence time

The invention claimed is:

1. A method for modeling, by means of a quantum computer (4), which has a multiplicity of qubits (5, 6), of a system (1) consisting of a conventionally describable bath (2) and a cluster (3) to be described quantum-mechanically, the system (1) elements of which are respectively able to occupy two states, wherein the qubits (5, 6) are first of all evaluated with respect to their system properties and categorized as high-performance qubits (5) and low-performance qubits (6) and a correlation of the high-performance qubits (5) to modeling of the cluster (3) as well as a correlation of the low-performance qubits (6) to modeling of the bath (2) is undertaken during a mapping process (7).

2. The method according to claim 1, wherein, during the evaluation of the quality and fidelity of the qubits (5, 6), operations are performed and measured on individual and connected qubits (5, 6) and used as basis for the evaluation.

3. The method according to claim 2, wherein the quality of the qubits (5, 6) is determined by measurement of their decoherence time (T2).

4. The method according to claim 2, wherein the excellence of the qubits (5, 6) is determined by measurement of the fidelity of the 1-qubit and 2-qubit operations.

5. The method according to claim 2, wherein the categorization of the qubits (5, 6) into high-performance qubits (5) and low-performance qubits (6) is carried out in accordance with one or more of the following paradigms: number of needed high-performance qubits (5), ratio of the qualities of the qubits (5, 6) present in the quantum computer (4) or fixed limit values of the fidelity of reproduction of the 1-qubit and 2-qubit operations.

6. The method according to claim 2, wherein, during the modeling of the cluster (3) by the high-performance qubits (5), each system element is described by high-performance qubits (5).

7. The method according to claim 2, wherein, during the modeling of the bath (2) by the low-performance qubits (6), several system elements are modeled by a small number of low-performance qubits (6).

8. The method according to claim 7, wherein the low-performance qubits (6) model a spectral density of the bath.

9. The method according to claim 7, wherein, during the mapping process (7), the core properties of the bath (2) are defined and only these essential characteristics are modeled by means of the low-performance qubits (6).

10. The method according to claim 1, wherein the system is a molecule or a solid body or another fermionic model.

11. The method according to claim 10, wherein the molecule models are molecules with active center, molecules with functional groups, molecules with justified selection of a relevant area or molecules in certain environments, or the solids are model systems such as the Hubbard model or realistic solid bodies.

12. The method according to claim 1, wherein the system is a Heisenberg model, an XYZ model or another spin model.

13. The method according to claim 1, wherein the system is a QUBO problem, a Boltzmann machine or another optimization problem.

* * * * *